United States Patent [19]
Davister

[11] 4,172,791
[45] Oct. 30, 1979

[54] MULTIPLE CELL FILTER HAVING A GAS DISCHARGE

[75] Inventor: Armand L. Davister, Liege, Belgium

[73] Assignee: Société de Prayon, Prayon, Belgium

[21] Appl. No.: 730,657

[22] Filed: Oct. 7, 1976

[30] Foreign Application Priority Data

Oct. 4, 1975 [LU] Luxembourg .......................... 73553

[51] Int. Cl.² ............................................ B01D 35/08
[52] U.S. Cl. .................................. 210/188; 55/185; 210/328; 210/344
[58] Field of Search ............... 210/328, 344, 188, 472; 55/185

[56] References Cited

U.S. PATENT DOCUMENTS

| | | | |
|---|---|---|---|
| 2,637,443 | 5/1953 | Schwartz | 210/328 |
| 2,997,068 | 8/1961 | Roos | 210/328 X |
| 3,216,576 | 11/1965 | Roos | 210/328 |
| 3,292,791 | 12/1966 | Muller | 210/344 X |
| 3,426,909 | 2/1969 | Garner | 210/328 X |

FOREIGN PATENT DOCUMENTS

609483 9/1960 Italy ............................................ 210/328

*Primary Examiner*—Frank A. Spear, Jr.
*Attorney, Agent, or Firm*—Weiser, Stapler & Spivak

[57] ABSTRACT

A cell filter having a collecting part divided into chambers and compartments and provided with cavities. Each compartment is provided on the one hand at the bottom thereof with at least one liquid-discharge outlet lying substantially below that level where the cavities open and on the other hand, above the liquid top level, with at least one passageway towards a gas-sucking device in such a way as to suck the gases while causing the gases and liquids to separate and go along different paths inside the compartments, means being provided to return to the original compartment those liquids which might have entered the passageways so as on the one hand, obtain at the distributor outlet, liquid-free gases and on the other hand, collect through the discharge openings only liquids which are substantially free from undissolved gases.

9 Claims, 29 Drawing Figures

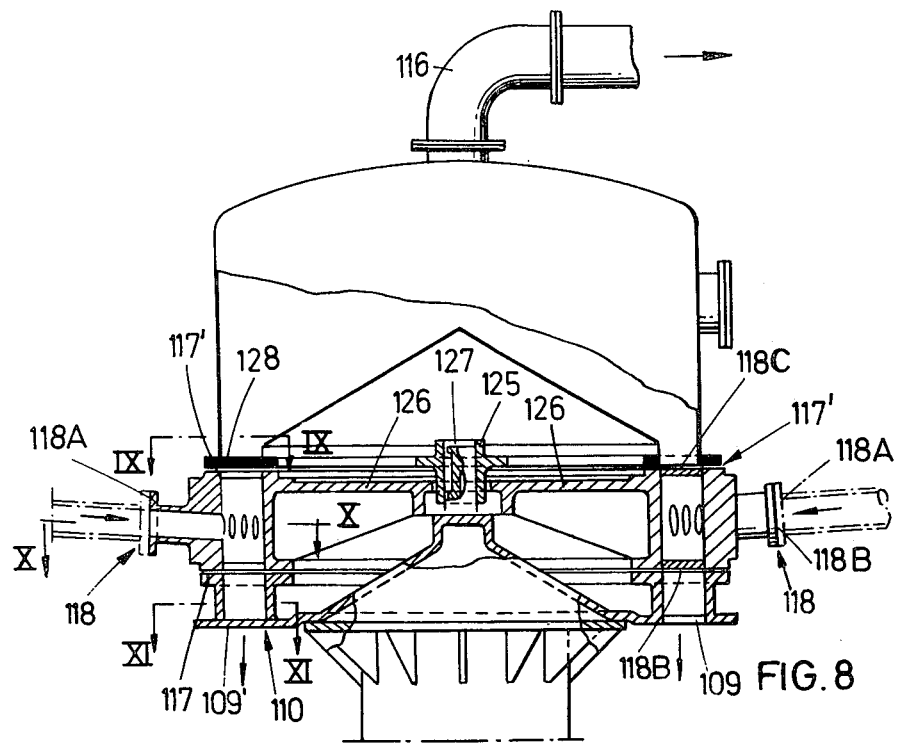
FIG. 8
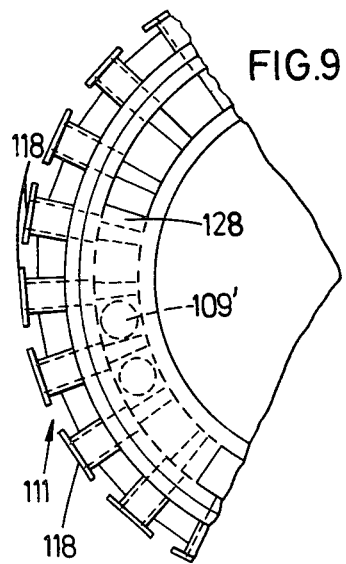
FIG. 9
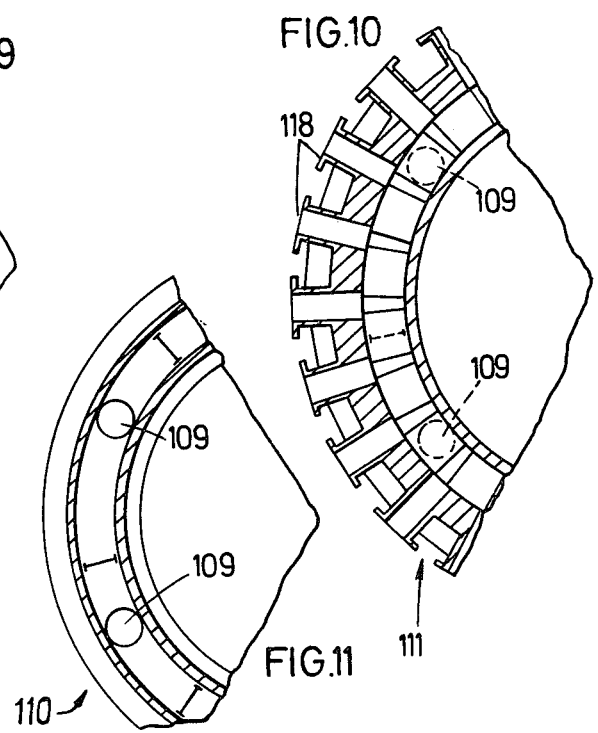
FIG. 10
FIG. 11

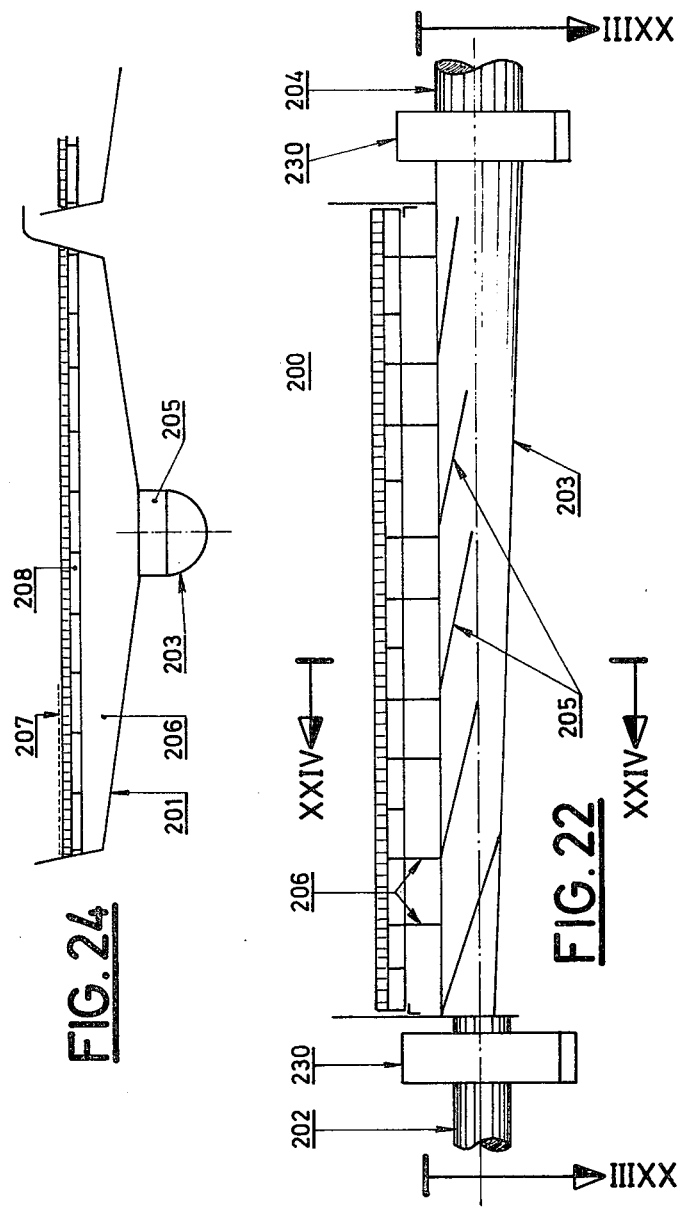

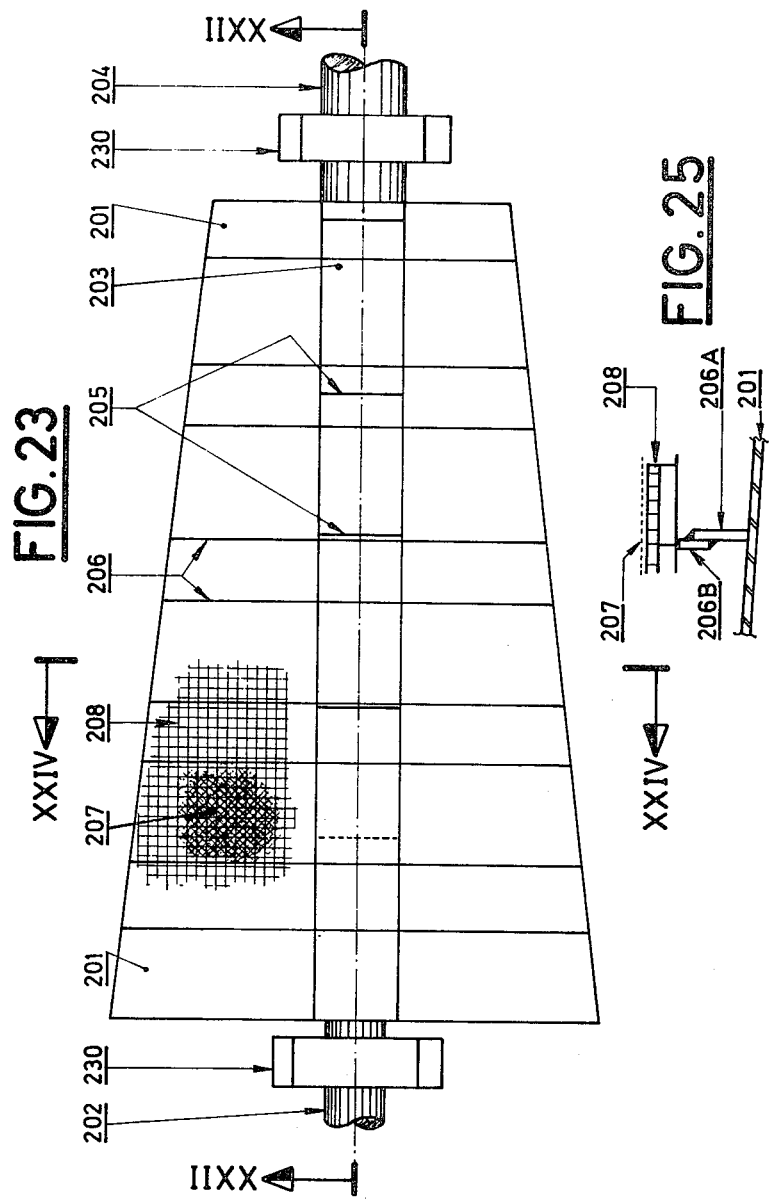

MULTIPLE CELL FILTER HAVING A GAS DISCHARGE

This invention has for object industrial filters comprising filtering cells and a distributor collecting and distributing fluids from the cells, said distributor comprising essentially a distributing part and a collecting part sliding relative to one another with a cyclic movement, the collecting part being divided into chambers and compartments bounded by partitions, said compartments communicating with one or a plurality of intake and discharge devices for gases and liquids, the chambers being isolated and communicating each with a sucking or pressurizing device, the collecting part comprising, in communication with each cell, cavities that open in sequence during the cyclic movement, in front of each one of said compartments and chambers, in such a way that during each cycle, each cell communicates in sequence with each one of said compartments and chambers.

Said distributing part divides or distributes the fluids from the cells in the succeeding compartments and chambers of the collecting part where they collect to be directed towards various discharge circuits.

In the known cell filters of said type, for example those filters which are the object of U.S. Pat. Nos. 2,684,158 and 3,072,136, during the filtering of some pulps, heavy cristallizings and scalings can be formed inside the filtrate circuits and possibly in the washing water circuit, which requires repeated stoppages and cleanings of the filters.

An essential object of the invention lies in obviating said drawback.

For this purpose according to the invention, each one of said compartments is provided on the one hand at the bottom thereof with at least one liquid-discharge outlet lying substantially below that level where the cavities open and on the other hand, above the liquid top level, with at least one passageway towards a gas-sucking device in such a way as to suck said gases while causing the gases and liquids to separate and go along different paths inside the compartments, means being provided to return to the original compartment those liquids which might have entered said passageways so as on the one hand, obtain at the distributor outlet, liquid-free gases, and, on the other hand, collect through the discharge openings but liquids which are substantially free from undissolved gases.

This invention has also for object improvements to filter cells with horizontal filtering surfaces so as to insure the fast and smooth filtering, flowing and discharging of the liquids and gases collected inside said cells, with a view to improving the efficiency of the washings both of the filter cake and of the filtering bed and the cells proper, and to avoiding or at least minimizing in this way the scale-formations in those filter parts also.

Said filters comprise a series of filtering cells with each such cell having a filtering bed which is essentially comprised of a filtering cloth bearing a rigid on apertured support, which is retained above the cell bottom in such a way as to leave a free space for the flow of those fluids that go through said cloth, said bottom slanting towards a drain channel which collects said fluids, said channel slanting in turn with the low end thereof opening inside a discharge duct connected to the distributor, said filters having for characteristic that guide members are provided to fractionate, divide and direct said fluids as they enter the drain channel into substantially parallel adjacent streams flowing to said discharge duct.

This invention further provides in the cells, particular fastening means which are common both to the filtering cloth and the support thereof, said means allowing to enlarge the useful area of the filtering cloth, by improving also the draining of those filter cake particles that lie along the circumference of the filtering bed. Said means further allow to replace rapidly and easily the cloths.

For this purpose according to the invention, the cloth edges are folded-back inside the cell and upwardly against the side walls thereof, means being provided to secure in a removable and vacuum-tight way said cloth edges against the inner walls and to fix simultaneously said support inside the cell, said means comprising rods formed by two diverging lengthwise arms enclosing an obtuse angle and having two continuous lengthwise projecting edges, said rods being arranged inside each cell along the filtering surface circumference thereof, said folded-back cloth edges being retained between two gaskets from elastomer material, the rod lengthwise projections bearing on the gaskets which lie, relative to the folded cloth edges, on that side opposite the inner side walls, fastening members such as bolts acting on the center rod portion lying at the junction of said arms so as to press the cloth and the gaskets against the side walls, while trying to spread resiliently the projections engaging the cloth, in such a way that the lower edge also bears on the cloth-support edges and secures same inside the cell.

The improvements brought about by this invention comprise various devices which speed-up substantially the filtering, the flowing and the separate collecting of the various fluids, which, allows the use of higher speeds and flow rates which by reducing the cycles, shorten the dwelling times for the fluids inside the filters and the ducting thereof and allow to wash amply and efficiently the filter inner members to thus minimize on the one hand, the action of the positive scaling factors and enhance, on the other hand, the scale-destroying factor action.

As the output per filter unit area is substantially increased relative to the known filters, due to the faster filtering with shorter cycling and enhanced inner flow, filters arranged according to the invention will be smaller for a given output capacity, thus with a correspondingly reduced cooling area, which results in a corresponding lowering of the scale-formation rate.

Moreover the application of all said improvements makes possible and economical the construction and use of swinging-cell filters with a very large surface area, which brings substantial savings in the capital costs for the still larger production units which are a feature of modern industry.

Other details and features of the invention will stand out from the following description, given by way of non limitative example and with reference to the accompanying drawings, in which:

FIG. 8 is an elevation view with parts broken away, of a third embodiment of a distributor according to the invention.

FIGS. 9, 10 and 11 are sequential part plan view, along lines IX—IX, X—X and XI—XI in FIG. 8, respectively.

FIG. 22 is a diagrammatic elevation view in cross-section along line XXII—XXII in FIG. 23 showing a cell completed with dividing and guiding members for the filtrate flow.

FIG. 23 is a plan view along line XXIII—XXIII in FIG. 22.

FIG. 24 is a cross-section view along line XXIV—XXIV in FIG. 22.

FIG. 25 is an elevation view in cross-section of a detail of the cell shown in FIGS. 22 to 24.

In the various figures, the same reference numerals pertain to similar elements.

Even if this invention relates in the main parts thereof, to cell filters in the broadest meaning thereof, it does pertain more particularly as a whole, to improvements to rotating filters with cells, the filtering surfaces of which should be flat and horizontal during the supply, filtering and washing steps, and more particularly to such filters, the filtering cells of which swing at the end of the filtering cycle to let the filter cake formed on the filtering surface, fall by gravity.

The general principle of such filters is known and has been the object of a plurality of Patents such as U.S. Pat. No. 2,684,158 and French Pat. No. 999,442.

Such filters comprise a series of filtering units which are generally called "cells", which undergo separately in a discontinuous way, the succeeding steps of filtering, washing, various special treatments, discharging the cake formed on the filtering surface, washing and drying the cells and the filtering cloth. All said various steps are reproduced during each movement cycle, all of these cycles comprising a continuous general process which is integrated into a filtering line.

Figure 1:
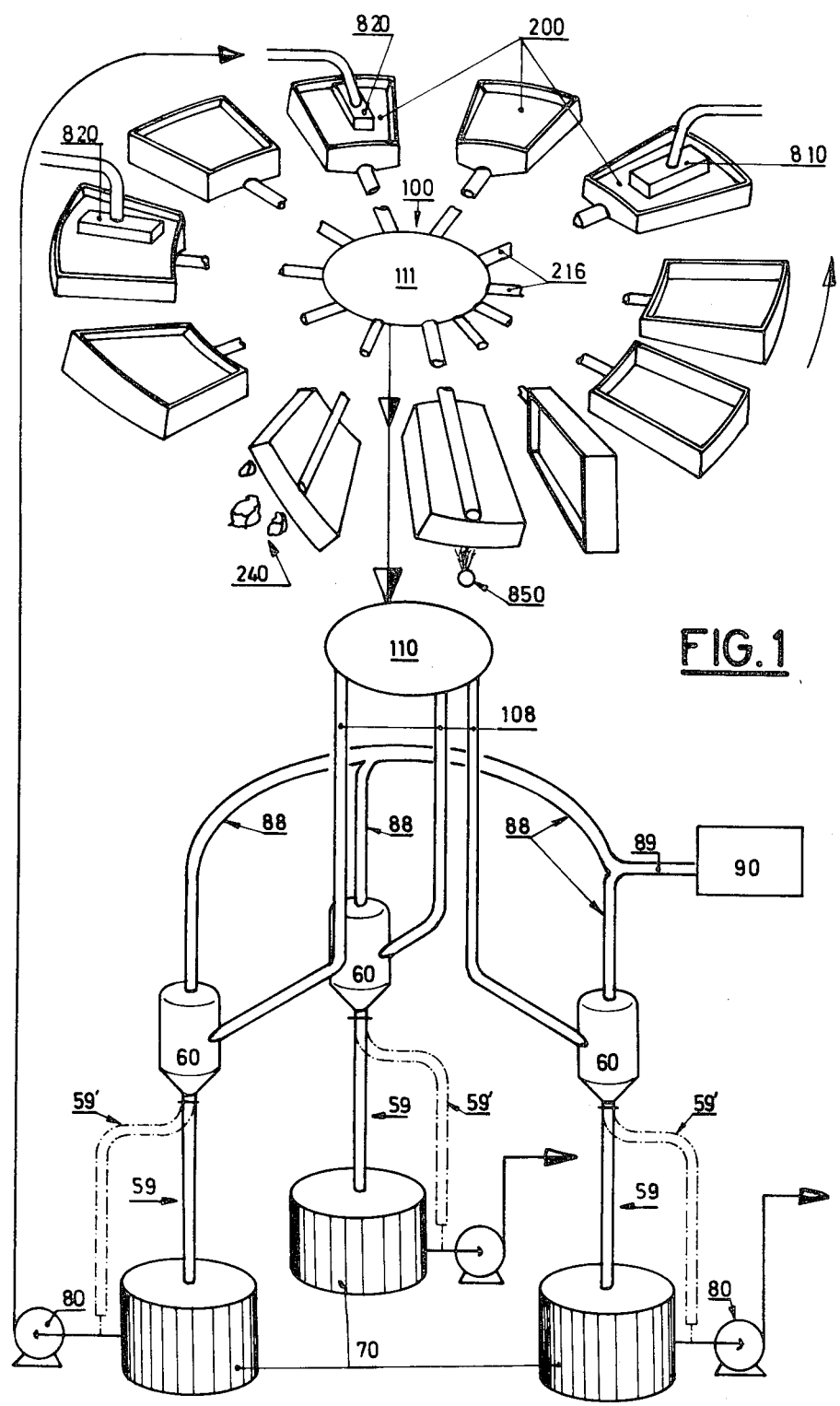
FIG. 1 is a diagrammatic perspective view of a rotating filter with swinging cells which is provided with a known conventional distributor.
Figure 2:
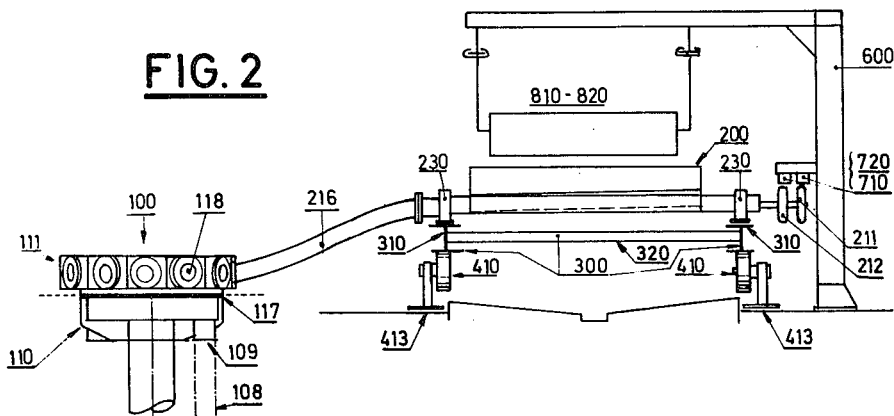
FIG. 2 is a diagrammatic view of such a filter.
Figure 3:
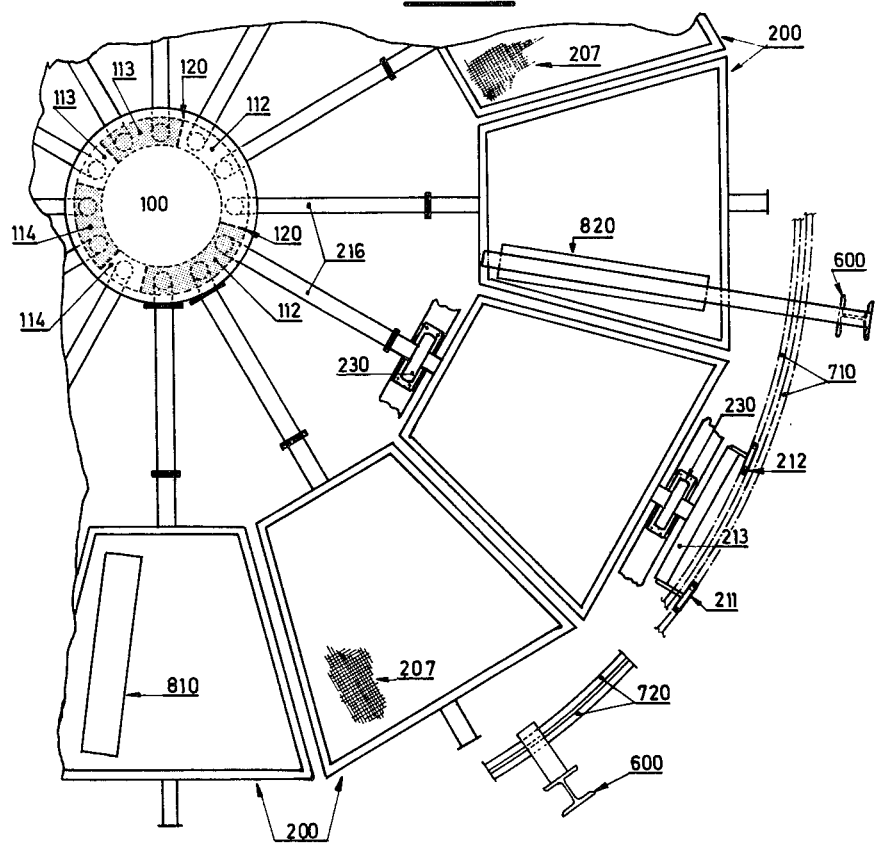
FIG. 3 is a part plan view of the filter shown in FIG. 2.

An example of such a filtering line is shown diagrammatically in FIG. 1 while other details of a corresponding filter have been shown diagrammatically in FIGS. 2 and 3.

Such a filter comprises essentially:

(a) a rotating frame 300, comprised of circular beams 310 joined by radial connecting arms 320 bearing cells 200 by means of bearings 230, said beams rotating on two series of rollers 410 made fast to the foundations and arranged in two concentric circles, the movement remaining centered due to the action of centering rollers not shown;

(b) a power unit, not shown, which conveys the movement to the rotating frame through a gear rack secured to one circular beam 310;

(c) guide levers 213 for the cells bearing two rollers 211, 212 which run on rails 710-720 made fast to a circumferential skeleton 600;

(d) distributing troughs 810 and 820 hanging from the skeleton 600 above the cells and which distribute therein the pulp to be filtered and the wash solutions;

(e) a central distributor 100 essentially comprised on the one hand, of a rotating circular distributing head 111 which has cavities 118 lying in a circle, which are connected respectively to the cells 200 through flexible hoses 216. This distributing head rotates together with the frame 300 and the cells 200 and on the other hand, of a fixed circular collecting base 110 which has chambers 114 and compartments 112-113 bounded by radial partitions 120, the rotating head 111 sliding when rotating on the fixed base 110 by means of a sealing planar friction gasket 117.

Distributing troughs 810-820 mating with the partitions 120 correspond to the limits of succeeding sectors for filtering and washing, those liquids and gases which have gone through the cell filtering beds in each sector being collected separately, each one in one compartment among the compartments 112-113 to be then discharged through corresponding pipes 108 towards separators 160 from which the liquids are discharged, through barometric pipes 59, into collecting pumps 70, or, as shown in dotted lines in FIG. 1, through pipes 59 towards suction pumps 80, the gases being sucked from said separators upwards to a vacuum circuit 90 through a collector 88-89.

The separators 60 are preferably arranged directly below the filter center portion, underneath the distributor, in such a way that the discharge pipes 108 from distributor 100 to separators 60 be as short as possible and slant as strongly as possible. The barometric discharge height which determines the gravity flow of those filtrates separated from the gas thereof, towards the collecting pumps 70, is to be measured from the base level of the separators 60, this requirement thus determining the level the filter is located at.

In the known cell filters, the liquids and gases sucked through the cell filtering beds and the gases formed inside the filters remain mixed and are turbulently stirred in the generally unsuitable flow circuits down to the separators 60 which causes heavy head losses, allowing but low flow rates and causing generally a strong cooling as well as very disturbing cristalizings and scales which might even make some filterings impossible.

Moreover the known filtering beds have too high a resistance to the passage of filtrates and gases, thus allowing but relatively low filtering capacities per filtering unit area, and they are also unsuited for intensive washing.

The devices for fastening filtering cloths and beds are generally unpractical and have a problematical tightness while encroaching on the circumference of the useful filtering surface.

Another filter disclosed in U.S. Pat. No. 3,072,136 differs from the filter shown in FIGS. 1 to 3 essentially by the distributor construction and arrangement.

Indeed said distributor has in each compartment of the collecting part, two subdivisions, the bottom of each one being connected to a discharge duct.

A partition with a low height between both said subdivisions lets the gases as well as the liquid overflow pass from the first subdivision to the second one. The discharge duct from the first subdivision discharges therefrom but liquid while the duct from the second subdivision should discharge all of the remaining fluids, that is all the gases as well as a liquid fraction that comprises:

(a) the liquid discharged from the cells through the cavities lying plumb with said second subdivision, (b) the excess liquid which has overflown from the first subdivision, and (c) the splashes and droplets carried by the gases originating from said first subdivision.

The stirring of the gases with the liquids thus goes on in the second subdivision and in the whole discharge circuit thereof, only that liquid amount taking part in said stirring being reduced and scale formation still occuring therein.

In the filter distributor according to the invention, particularly in the embodiments described hereafter and shown in the accompanying figures, all of the liquid is immediately and completely separated from the undissolved gases in the very body of the distributor, thus preventing the stirring which would cause the scale formations in the mixed fluid circuits.

Moreover the improved filter according to the invention allows increased flow rates, short cycles and high rotating speeds which strongly reduce or prevent inner scale formation. It is moreover provided with increased-efficiency filtering beds which are easier to use and allow to apply under better conditions, intensive outer and inner washings as disclosed notably in French Pat. No. 7,220,473 and U.K. Pat. No. 1,376,383.

Figure 4:
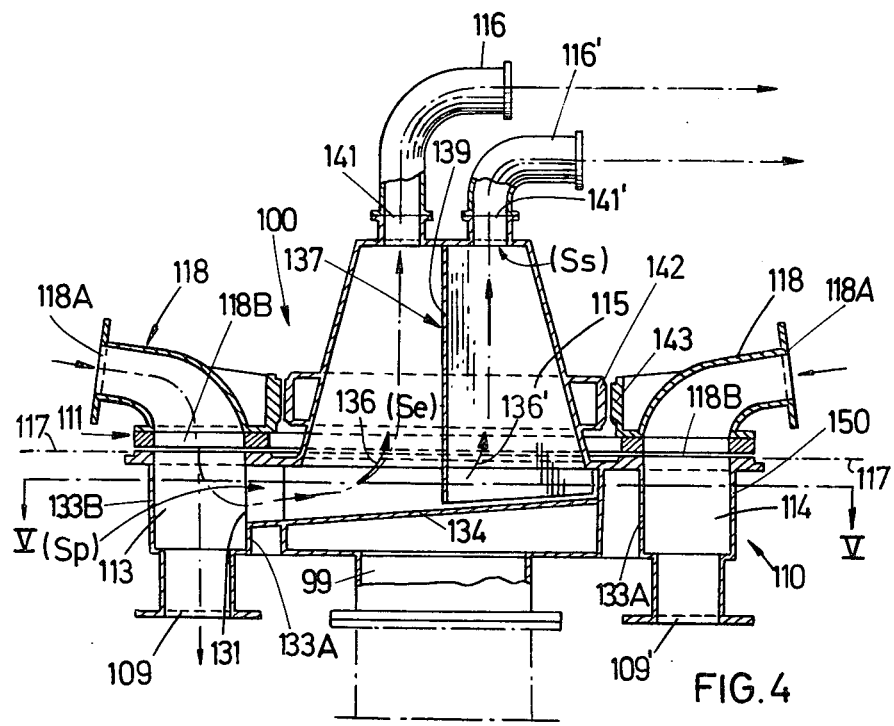
FIG. 4 is an elevation view in section along line IV—IV in FIG. 5, of a first embodiment of a distributor according to the invention which is to replace the conventional distributor of the rotating cell filters as shown in FIG. 1 by reference numerals 100, 110 and 111.
Figure 5:
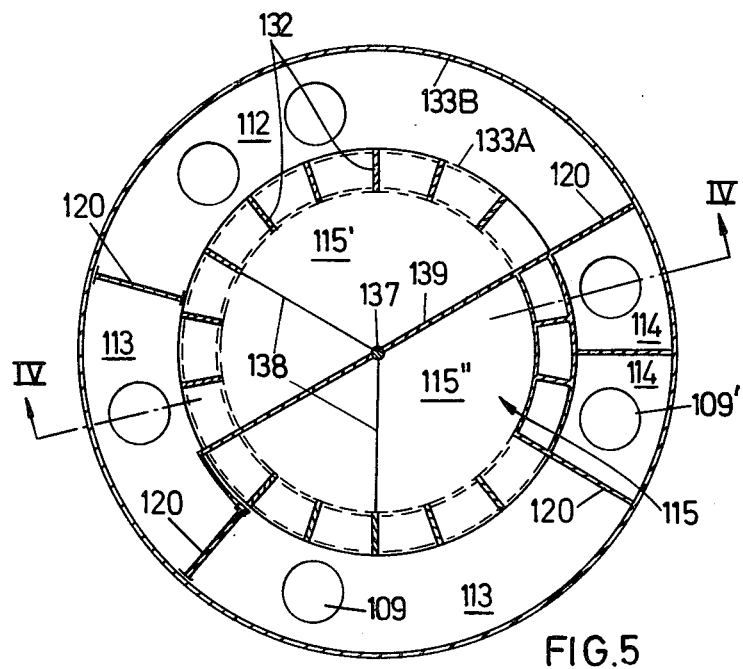
FIG. 5 is a view in cross-section along line V—V in FIG. 4.

FIGS. 4 and 5 show a first embodiment of a central collecting distributor 100 which has been improved according to the teachings of the invention. Said distributor comprises the same main components as the above-described conventional distributor: distributing head 111 having as many cavities 118 as there are filtering cells, said cavities receiving through the ends 118A thereof each connected to a cell through a flexible hose 126 (see FIGS. 1 to 3), the fluids sucked therefrom and discharging said fluids in sequence through the ends 118B thereof into the compartments 112-113 and chambers 114 in the collecting base 110, through the friction gasket 117. The compartments 112-113 and chambers 114 form together a circumferential circle-shaped trough opening upwards, the position of the partitions 120 that bound the compartments and chambers relative to one another, being adjustable inside said trough.

Due to their being open at the top, the compartments and chambers communicate each with one or a plurality of cells through the ends 118B of the corresponding cavities.

The application of a driving suction inside said compartments causes a suction inside the cells through the cavities 118 and pipes 216.

Conversely a pressure inside a chamber is communicated along the same path inside the corresponding cells.

The cavities 118 move above the chambers 114 and compartments 112-113 and communicate each in sequence with each chamber and compartment. All of said compartments have, preferably at the bottom thereof, at least one discharge outlet 109 facing downwards and connected to a discharge duct 59 (FIG. 1), which is preferably a barometric duct and discharges the liquid into a collecting sump 70 at the atmospheric pressure, from which sump the liquid overflows or is sucked by a pump 80 (FIG. 1), for example towards a filtrate storage tank 70.

As a variation, a pump 80 can suck the liquid under a pressure lower than the atmospheric pressure. In each case, the exhaust circuit is so adjusted as to suck but liquid free from any gas phase.

The discharge outlets 109' of the chambers 114 are connected through pipes 108' to discrete sources of fluid suction or pressure according to the operations which are to be performed in the cells or in the distributor.

The chambers 114 are completely enclosed sidewise by the inner circle-shaped walls 133A and the outer circle-shaped walls 133B of said trough, as well as by the radial partitions 120. They communicate each downwards with a pipe 108' and upwards with the cavities that pass respectively in front thereof.

The compartments are bounded in the same way and communicate with the discharge pipes and with the cavities. However the inner circle-shaped wall 133A does extend but over a low height above the maximum level reached by that liquid which flows over the bottom and thus said wall leaves free thereabove for the gas release, large passageways 131 leading to the inner volume of the distributor.

Vertical radial plates 132 bear the inner edge of the sliding surface 117, with but a negligible encroachment on the release passageways 131 for the gases; said passageways may on the other hand be enlarged according to the gas flow rate while the height of said trough can be varied at will.

As soon as it enters a compartment, the gas-liquid mixture from any cell falls by inertia and gravity to the compartment bottom and then enters through the discharge outlet 109, while the gases which are subjected from the outset to the underpressure caused by a suction device, are exhausted sidewise through the passageways 131 towards the free space left in the center portion of the fixed distributor base and which extends upwards into the free circle-shaped space in the rotating head 111, all said various spaces comprising a separating chamber 115 for the liquid droplets carried by the gases. The slanting bottom 134 of said chamber returns to the original compartment bottom those droplets which settle thereon.

The gases, essentially free from the carried droplets, are sucked through the outlet 141 in the top portion of chamber 115.

When required, the separating chamber can be divided by partitions 138 into sectors communicating respectively with one or a series of succeeding compartments.

The separating chamber 115 may be of truncated shape as shown in FIG. 4, of cylindrical shape or of bulbshape and it may comprise when required, special shapes for the partitions 138, baffles or any other means required for the desired settling of the droplets.

An additional final separator, not shown, can when required, complete the capturing of the finest droplets, a single separator for each suction source being required as opposed to the multiple separators 60 used as shown in FIG. 1 with a conventional distributor.

It should be noted that the fine liquid particles which reach the chamber 115 and/or the final separator, correspond but to a negligible proportion of the liquids entering the distributor and the cristalizings or scale formations they may cause are thus minimized, without any common measure with the ones that might result from the complete liquid amount.

The separating chamber 115 may be divided into two or more enclosures isolated from one another and communicating each with a discrete gas suction source.

In the example as shown in FIGS. 4 and 5, two enclosures 115' and 115", separated by a partition 139, communicate through outlet openings 141, 141' and pipes 116, 116' with discrete suction sources.

The partition 139 is sealingly joined to the partition 120 corresponding thereto.

The combination of a plurality of suction sources, with such discrete enclosures, allows one to apply different suction magnitudes to the various filtering cell groups corresponding to the various enclosures, said enclosures being graded according to the best suitability for each one of the filtering phases and washing steps, and such combination allows particularly to perform a thorough final draining of the filter cake before discharging same, under a suction which does not affect the suction or suctions applied to the filtering and washing sectors.

The fixed base 110 is borne in the present example by a standard 99. The rotating head 111 forms where it contacts the fixed base, a joint 117 which is sealed under the action of gravity and inner underpressure and said head is centered during the rotation thereof for example by concentric centering collars 142 and 143 integral whith the fixed base and the rotating head respectively. Advantageously said joint 117 is comprised of the engagement of a collar from soft resin 124 forming the sliding surface of the rotating head, with a metal collar which forms the top sliding surface of the fixed base. The steady wear of the soft resin on the hard metal retains a good sealing.

Figure 6:
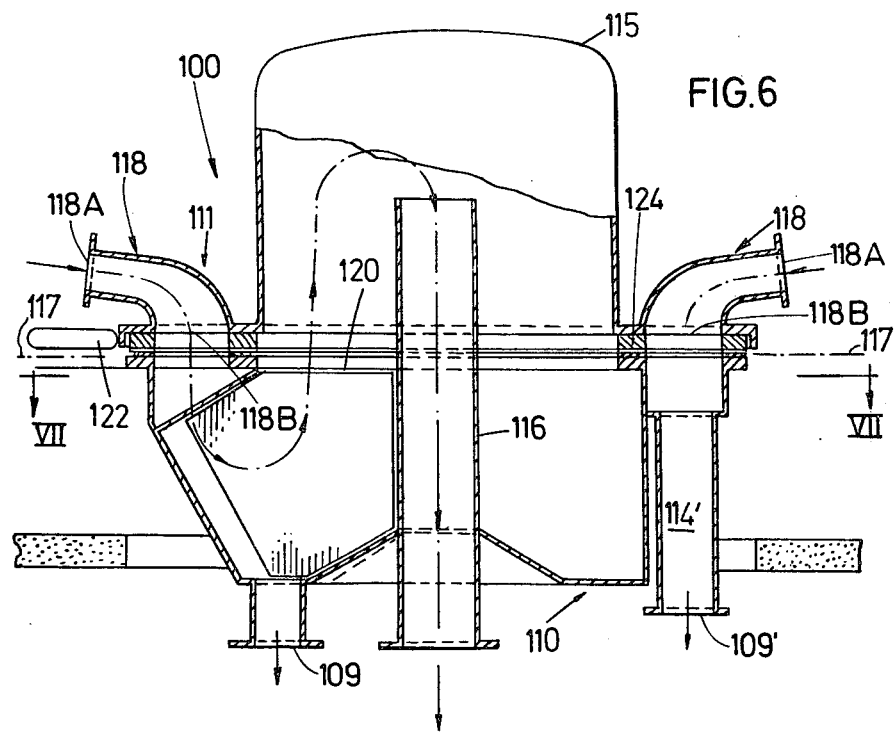
FIG. 6 is an elevation view in section along line VI—VI in FIG. 7, showing a second embodiment of a distributor according to the invention.

Instead of using as shown in FIG. 4, pipes 116-116' connected to outlets 141-141' located in the separating chamber top, the gas suction may be made through pipes passing through the center portion of the fixed base and the mouth of which lies inside the separating chamber adjacent the top thereof, as it is the case in the embodiment as shown in FIG. 6.

The carrying of droplets in the gases requires with the usual industrial filterings, maximum rates thereof of about 3.5 m/sec. and preferably 3 m/sec., for a liquid viscosity of about 2 centipoise which corresponds to a minimum passage area Sp of 0.6 $dm^2$ and preferably 0.75 $dm^2$ per square meter of active filtering surface. Said values may vary according to the viscosity. The passage area for the rising stream at the separating chamber bottom, Se, as shown by arrow 136, should be at least 0.8 $dm^2$ and preferably 1.25 $dm^2$ with outlet openings 141-141' of 0.15 $dm^2$ and preferably 0.25 $dm^2$, all these values being given for one square meter of filtering surface.

For filtering with very high or very low gas flow rates, the above usual values for the passage areas would be increased or reduced according to such flow rates.

The partitions 120 and 139 can be adjusted in position according to the division of the various sectors which the operator wishes to assign to the filtering of succeeding liquids. FIGS. 18 to 21 show by way of example, two embodiments of adjustable partitions.

Figure 19:
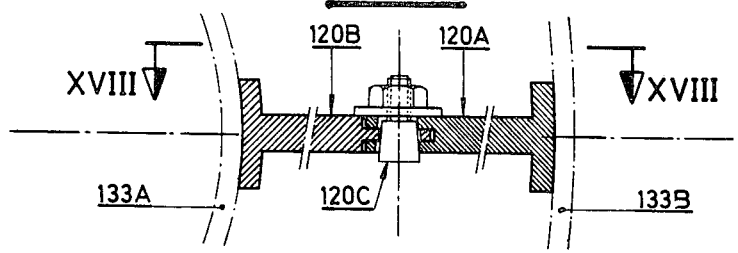
FIG. 19 is a plan view in cross-section along line XIX—XIX in FIG. 18 of the same detail.
Figure 18:
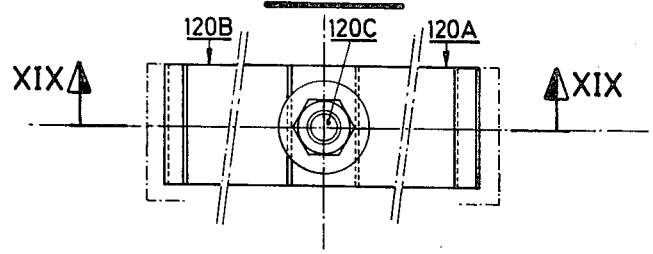
FIG. 18 is an elevation view in cross-section along line XVIII—XVIII in FIG. 19 of a first embodiment of a detail of a distributor according to the invention.

In FIGS. 18 and 19, each partition comprises two half partitions 120A and 120B assembled by means of a bolt 120C with slanting surfaces, which when the bolt is tightened, press both half partitions against the trough walls 133A and 133B.

Figure 20:
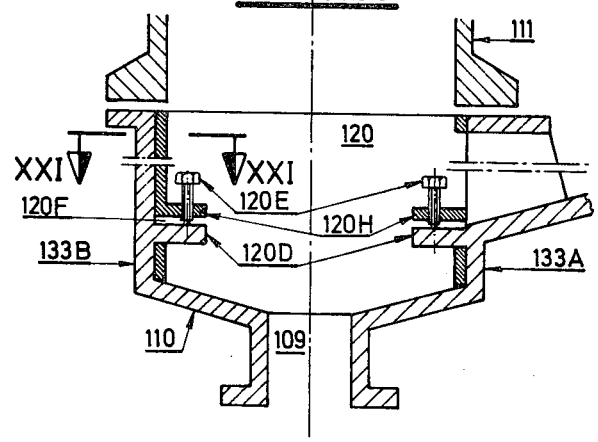
FIG. 20 is an elevation view in cross-section along line XX—XX in FIG. 21, of a second embodiment of the same detail of the distributor according to the invention.
Figure 21:
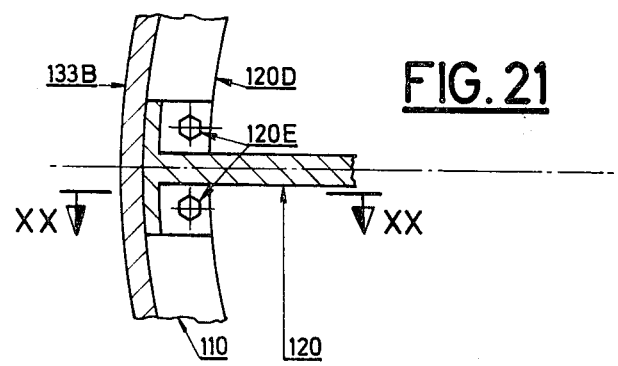
FIG. 21 is a part plan view along line XXI—XXI in FIG. 20.

In the embodiment shown in FIGS. 20 and 21, recesses 120F let the partitions slide over rails 120D, the partitions being wedged on said rails by means of clamping screws 120E. The partitions 139 may for instance swing about a central vertical shaft 137 and be locked by any usual means, such as bolts or pins.

The final cake drying at the cycle end, before discharging said cake, may be performed under the action of one chamber 114 which is connected to a discrete suction device which sucks a large air volume through a particular droplet separator, thus retaining the separating chamber for the relatively low gas flow rates of the filtering operations proper.

The direct suction through said particular separator, of the air passing through the cake already relieved of the liquid thereof does no more result in a danger of scale formation which the invention seeks to avoid.

Some other changes in the new distributor according to the invention will be described hereinafter as regards the main features which differ from the first embodiment shown in FIGS. 4 and 5.

Figure 7:
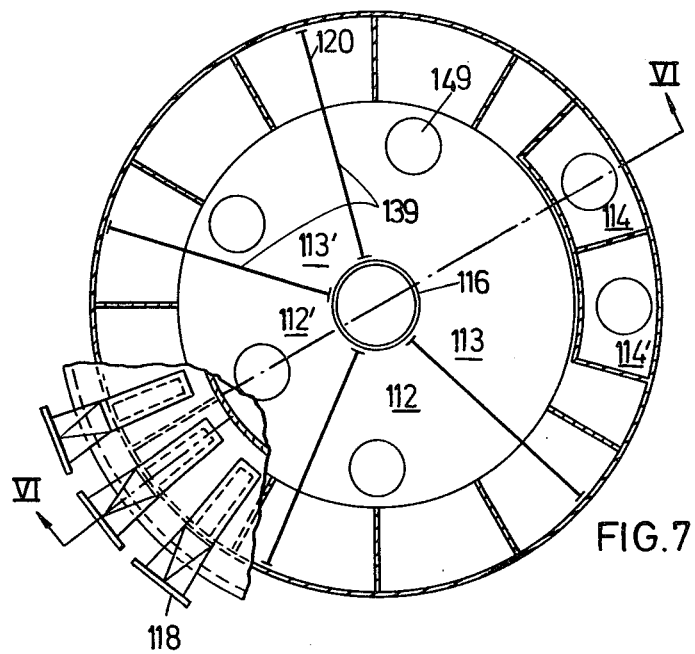
FIG. 7 is a view in plan and in cross-section along line VII—VII in FIG. 6.

In a second embodiment shown diagrammatically in FIGS. 6 and 7, the rotating unit 111, 118, 124 is integral with the top portion of the separating chamber 115 which rotates therewith, while the chamber bottom portion comprises the center part of fixed base 110, the gas suction being performed through the pipe 116 which goes through the fixed base and the mouth of which lies adjacent the separating chamber top.

In a third embodiment, shown diagrammatically in FIGS. 8, 9, 10 and 11, the movable part 111 with the cavities 118, rotates between two friction gaskets 117 and 117', between the fixed separating chamber 115 and the fixed base 110 whith the compartments and chambers. The cavities have two outlets, an upward outlet 118A for the gases to the separating chamber, and a downward outlet 118B for the liquids to the compartments and chambers in the fixed base.

The liquid-gas separation is thus made originally and essentially in the cavities, to be then completed in the separating chamber. The sliding surface thereof is open above the compartments but closed-off above the chambers 114 and 114'.

The rotating part has a core 125 to which are connected spokes 126 and which rotates about a center pivot 127 of the fixed base 110.

Figure 12:
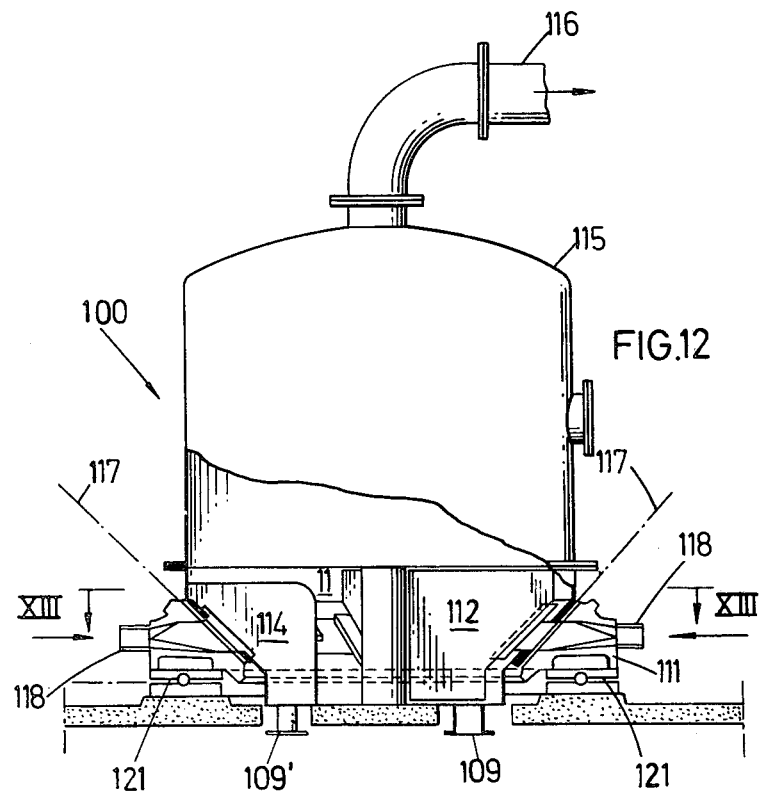
FIG. 12 is an elevation view with parts broken away, of a fourth embodiment of a distributor according to the invention.
Figure 13:
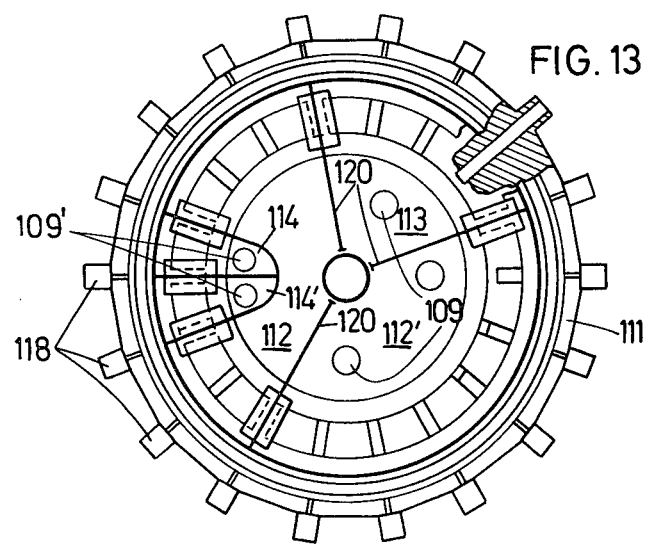
FIG. 13 is a plan view with parts broken away and in cross-section along line XIII—XIII in FIG. 12.

In a fourth embodiment, shown diagrammatically in FIGS. 12 and 13, the sliding gasket 117 is of frusto-conical shape and the rotating head 111 rotates together with the cavities 118 thereof, about a conical surface of the fixed base 110 which is provided with openings communicating with the chambers 114 and 114' and the compartments 112-113, inside which the fluids enter sidewise, the gases are released at the top, and the liquids flow through the bottom outlets 109 and 109'.

The fixed separating chamber 115 tops the fixed base 110 and is integral therewith. The rotating head 111 rotates on a rolling race 121.

Figure 14:
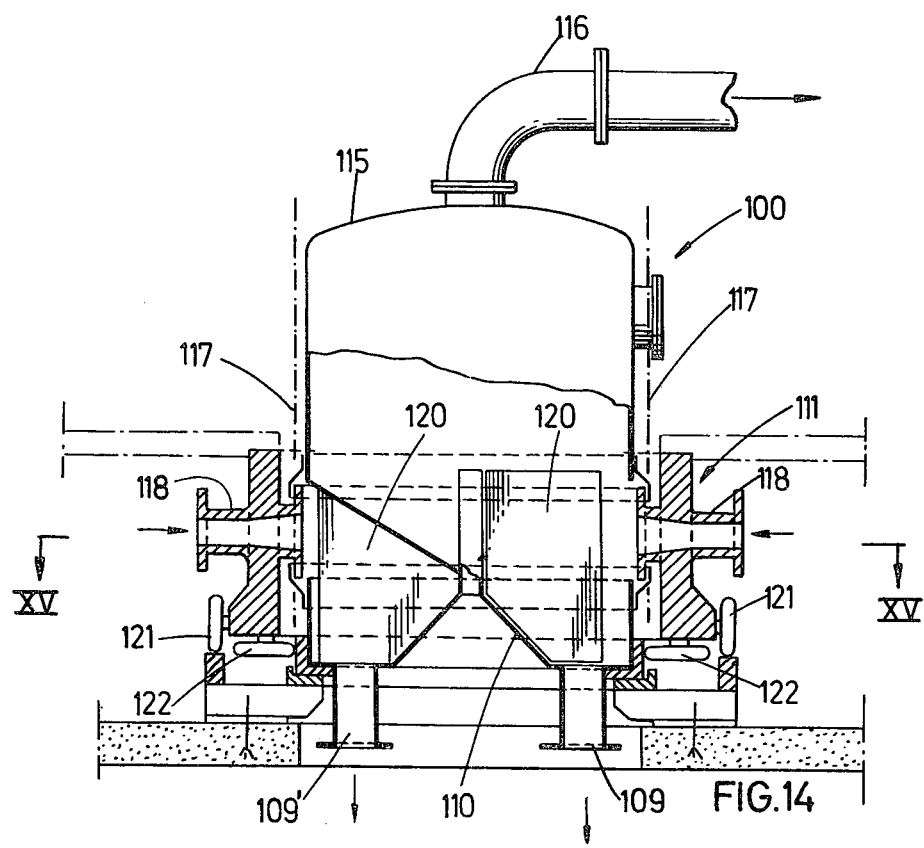
FIG. 14 is an elevation view with parts broken away along line XIV—XIV in FIG. 15 relating to a fourth embodiment of a distributor according to the invention.
Figure 15:
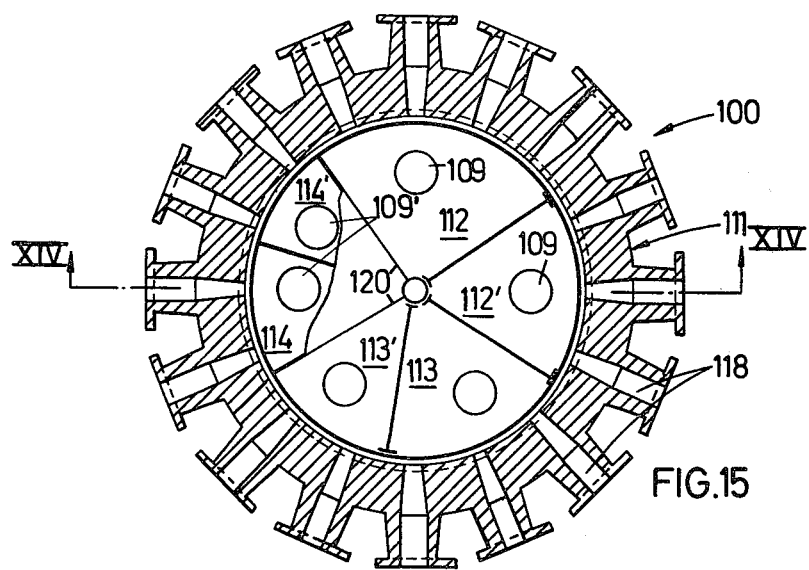
FIG. 15 is a plan view in cross-section along line XV—XV in FIG. 14.

In a fifth embodiment, shown diagrammatically in FIGS. 14 and 15, the rotating head 111 rotates about the unit formed by the fixed base 110 and the separating chamber 115, by sliding on a vertical cylindrical sliding surface 117 and rolling on rollers 121 while being guided by centering rollers 122.

Figure 16:
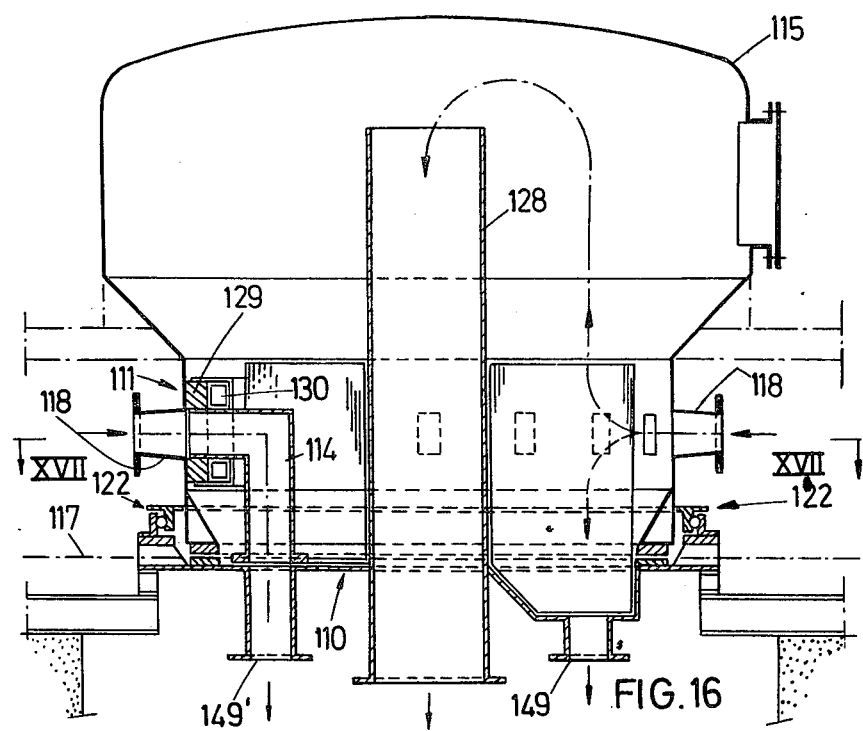
FIG. 16 is an elevation view in cross-section along line XVI—XVI in FIG. 17, showing a sixth embodiment of a distributor according to the invention.
Figure 17:
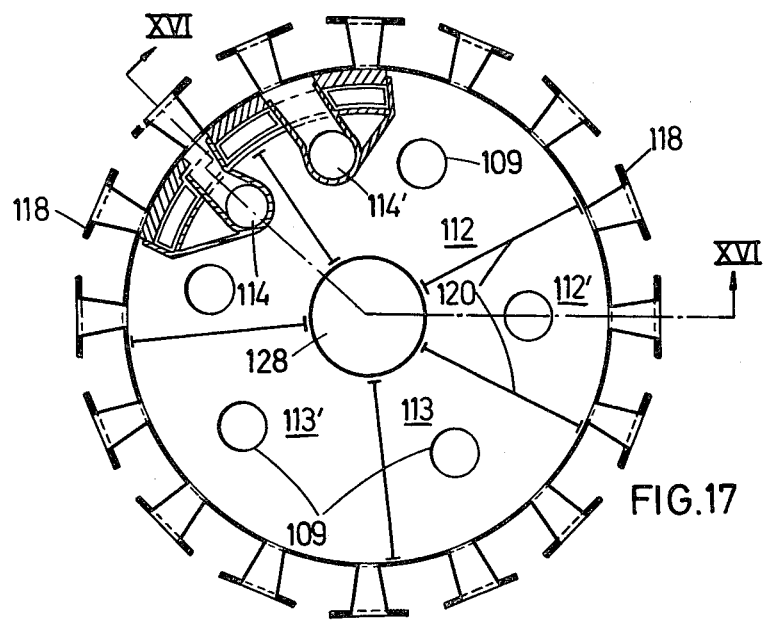
FIG. 17 is a plan view in cross-section along line XVII—XVII in FIG. 16.

In a sixth embodiment, shown diagrammatically in FIGS. 16 and 17, the separating chamber 115 and the rotating head 111 form a single unit which rotates by sliding on a horizontal ring-shaped gasket 117 which engages the fixed base 110. To the difference with the preceding embodiments, the sliding gasket does not have an opening for the passage of the fluids from the movable part to the fixed part. The cavities 118 lie all around the lower portion of the rotating unit, the gases are released upwards in the separating chamber and the liquids flow down into the base compartments, while the chambers 114 and 114' form bent ducts passing through the fixed base and communicating with the openings 118 through gaskets 129 engaging the cylindrical sliding surface. By way of example, said gaskets are made from resin and applied against the cavities by means of pressurized-air pockets 130 as shown in FIG. 11, or by similar means such as springs—not shown.

The essential advantages of the new distributor type according to the invention, which might be called "distributor-separator", are as follows relative to the conventional distributors:

(1) it does away substantially, or at least strongly reduces in the most heavy cases, with the scales both in the distributor itself and in the piping and apparatus that lie downstream in the filtrate circuits;

(2) it allows to do away in the filtering installation, with the multiple inner separators together with the complex piping network thereof for connecting to the distributor and the vacuum circuit;

(3) it allows to lower the filter level by 3 to 4 meters relative to the conventional case where external separators are mounted underneath the filter center;

(4) it allows to strongly reduce or even do away with foaming caused by turbulent gas-liquid mixtures, due to the previous separation of the gases and the better fluid flows;

(5) it allows to substantially reduce and smooth the head losses in the filtrate and vacuum circuits, which results in a better vacuum utilization.

The new distributor-separator type according to the invention may be applied to any cell filter, whether the cells thereof are fixed or movable with a rotating or translation movement.

Another improvement according to the invention which can be applied to cell filters, in combination or not with the above-described distributor-separator, relates to means insuring a fast flow and discharge of the filtrates and gases removed from the cells.

The improved cell 200 of trapezoidal shape has been shown diagrammatically in FIGS. 22, 23, 24. It does comprise a bottom 201 with at least two slanting surfaces, preferably by 4° to 8° to the horizontal, towards a draining channel 203 which extends along the cell lengthwise axis. The channel bottom slants by 1° to 4° towards an opening 204 connected to a pipe 216, for letting out and discharging the gases and liquids to the distributor. Said channel is provided with guiding, dividing and distributing means for the fluids which are advantageously comprised of baffle-plates 205, located at the channel top and slanting towards the mouth 204, thus providing an apertured inlet to the channel over the whole length thereof and guiding the fluids to the mouth.

According to the invention, the total cross-section area of the passage through the plate network is equal to 1.5 to 6 times, preferably 1.5 to 3 times the smallest cross-section area of mouth 204, which is proportional to the filtering surface area of the cell and to the fluid flow rates typical of the considered filtration, that is 0.2 to 0.6 $dm^2/m^2$ filtering area, for the most usual filtrations.

The plate advantages are more marked for the usual filtrations when said baffle-plates have an angle of 2° to 20°, preferably 3° to 12°, relative to the horizontal plane, the end plate opposite the mouth might have an angle of 20° and even up to 30°.

The slanting angles are larger for the larger fluid flow rates.

As a variation for the baffle-plates, the dividing and distributing of the fluids might be obtained, but with generally less advantageous results, by means of a channel top wall provided with a series of calibrated openings distributed over the length thereof, and having an increasing cross-sectional area from opening 204. Such a variation has not been shown however.

Advantageously, the dividing made at the inlet to channel 203 is extended in all of the space between the cell bottom and the filtering bed by means of ribs 206 substantially at right angle to the channel, which divide said space into flow compartments, said ribs also being used to support the filtering bed.

Each baffle-plate 205 connects with the top edge thereof to one of the ribs 206, the unit formed by the plates and the ribs comprising, for the fluid flow, a series of parallel channels inside which is generated one and the same driving suction which extends down to underneath the filtering cloth. The plate number lies advantageously between 1.5 and 10, preferably 2 to 4 per running meter of channel length, while the rib number may be 3 to 10 per running meter. The ribs provided between two ribs which are connected to baffle-plates may be apertured.

FIGS. 22, 23, 24 show a swinging cell provided with a shaft 220 and bearings 230, but the invention also applies to non-swinging filtering cells.

The invention further relates to improvements to the fastening of the filtering cloth and the support thereof, particularly in filters with swinging cells, such as the Prayon filter.

Figure 26:
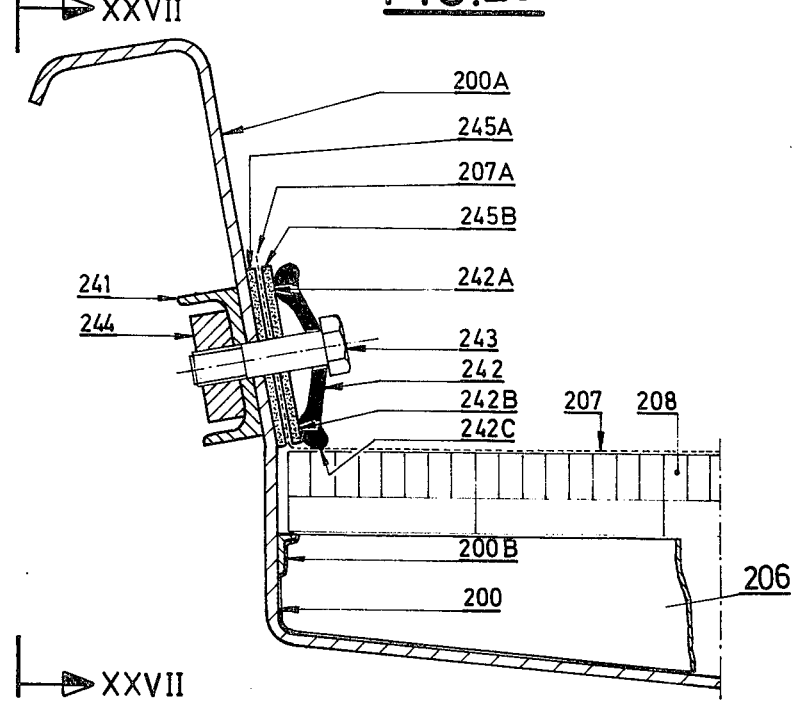
FIG. 26 is a part diagrammatic view in cross-section along line XXVI—XXVI in FIG. 27 showing a first particular embodiment of the means for fastening the filtering cloth and supporting same inside a filter cell according to the invention.
Figure 27:
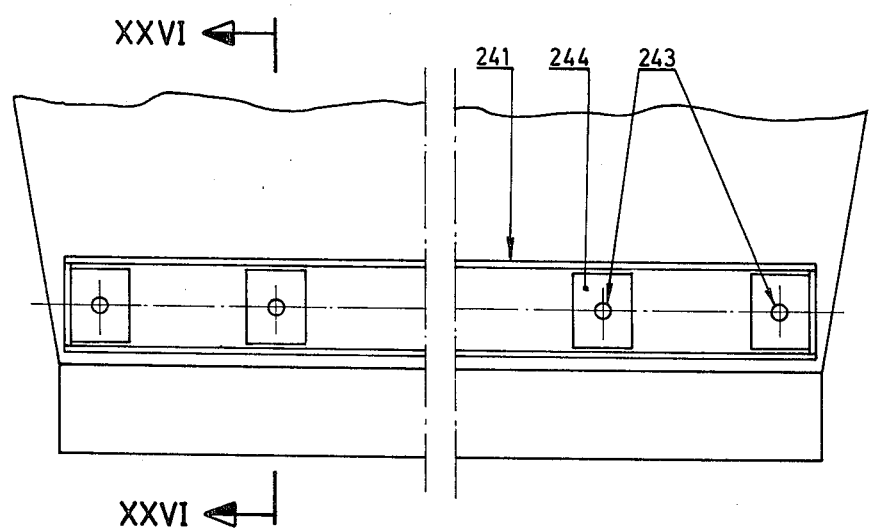
FIG. 27 is a side view along line XXVII—XXVII in FIG. 26.
Figure 28:
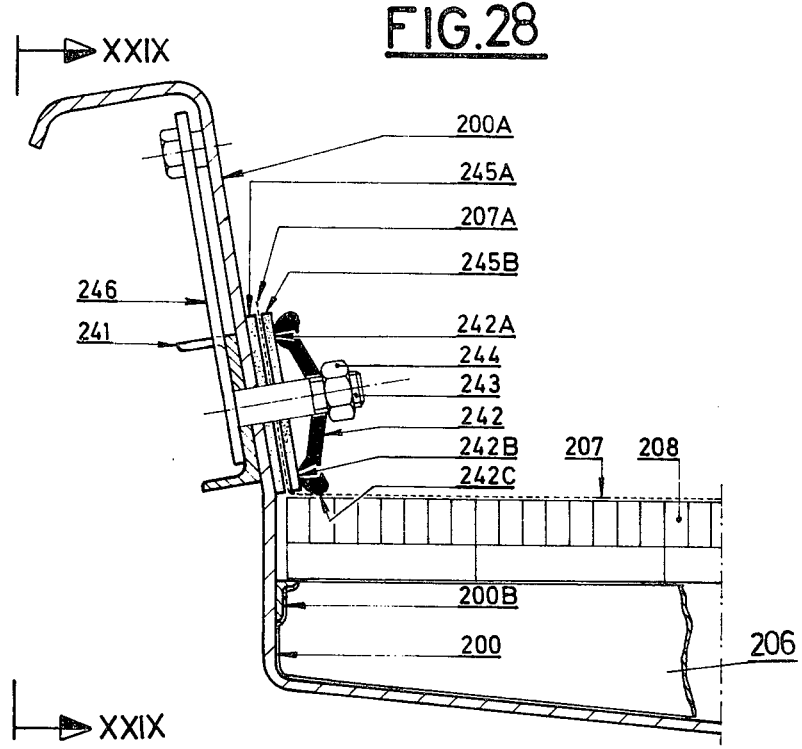
FIG. 28 is a part cross-section view along line XXVIII—XXVIII in FIG. 29 showing a second embodiment of a filter cell provided with special means for fastening the filtering cloth and supporting same inside the cell.
Figure 29:
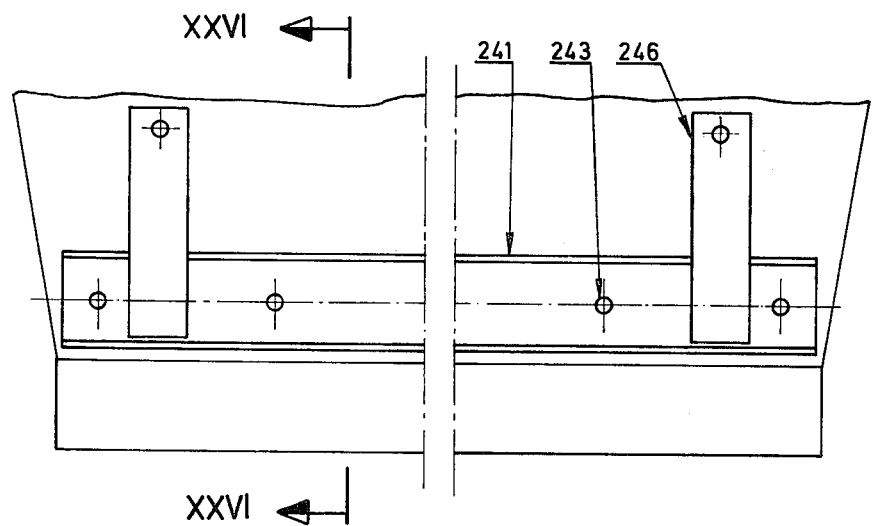
FIG. 29 is a side view along line XXIX—XXIX in FIG. 28.

FIGS. 26 and 27 show a first embodiment of such fastening means in which the edge 207A of the cloth 207 is folded back against the side wall 200A, the unit comprised of cloth 207 and support 208 is pressed at the cell bottom against the ribs 206 and circumferential shoulders 200B by a set of rods 242 having two diverging lengthwise arms the free lengthwise edges of which are provided with projections 242A and 242B. Said rods 242 are combined with a set of U-sections 241 with a high stiffness which are applied horizontally against the outer surface of wall 200A. The rods 242 are located on the inner surface of wall 200A so as to mate with the cloth edge and the outer sections 241. The edge 207A is clamped between rod 242, on the one hand, and the wall 220A and the section 241, on the other hand, by means of two gaskets 245A and 245B from rubber or similar material, sealing being easily obtained with the linear engagement of the lengthwise projections 242A and 242B of rods 242 that press the gaskets and cloths against the stiff sections 241.

The pressing together of this whole unit is obtained for instance with bolts 243 spaced by 20 to 40 cm, which are introduced by way of the inner surface of the cell edge and screwed through the rods, the gaskets 245A ans 245B of wall 200A and a section 241, into a nut secured to said section.

Such an arrangement allows an easy and fast replacement of the cloth, requiring but the handling of a small number of bolt shafts 243.

The free lengthwise edges of rods 242 are provided with a slanting surface, the free lower edge bearing on the cloth 207 and the support 208 to apply same unmovingly against shoulder 200B that extends over the circumference of inner wall 200A, underneath the support and against ribs 206 which extend cross-wise to the bottom of cells 200.

As the above-described securing means project but slightly inside the cell, they encroach very little on the filtering surface, they let the suction generated inside the cell draw more smoothly and efficiently the fluids along the cell circumference, they improve thereby the washing efficiency of the cake margin, they lower the final moisture contents thereof and they enhance a straight fall of the cake over all of the circumference thereof when the cell turns-over.

It should be understood that the invention is in no way limited to the above embodiments and that many changes may be brought therein without departing from the scope of the invention as defined by the appended claims.

I claim:

1. Industrial filter comprising filtering cells and a distributor collecting and distributing fluids from the cells, said distributor comprising essentially a distributing part and a collecting part sliding relative to one another with a cyclic movement, the collecting part being divided into chambers and compartments bounded by partitions, said compartments communicating with one or a plurality of intake and discharge devices for gases and liquids, the chambers being isolated and communicating each with a sucking or pressurizing device, the collecting part comprising in communication with each cell, cavities constructed to open in sequence during the cyclic movement, in front of each one of said compartments and chambers in such a way that during each cycle, each cell communicates in sequence with each one of said compartments and chambers and introduces into said compartments and chambers said gases and liquids from said cells, said filter being improved in that each one of said compartments is provided on the one hand at the bottom thereof with at least one outlet for discharging liquid, said outlet lying substantially below that level where the cavities open and on the other hand, at least one passageway constructed to extend from a level above that of the introduced liquid towards a gas-sucking device in such a way as to suck said gases while causing the gases and liquids to separate and go along different paths inside the compartments, means being provided to return to the original compartment those liquids which might have entered said passageways so as on the one hand, obtain at the distributor outlet, liquid-free gases and on the other hand, collect thtough the discharge openings but liquids which are substantially free from undissolved gases.

2. Filter as defined in claim 1, in which the distributing and collecting parts are of circle-shape and are rotated relative to one another, the collecting part being located underneath and/or sidewise relative to the distributing part, said distributing part being joined to the filter cell unit and being either fixed or movable as said unit.

3. Filter as defined in claim 1, in which the distributor comprises at least one chamber for separating gas and liquid, said chamber lying between the compartments and the suction device(s), said separating chamber having partitions for separating gas streams according to the compartment boundaries, and means for collecting the fine droplets possibly carried away with the gases, said separating chamber being divided into as many sections as there are discrete suction devices so as to allow sucking the gases through different circuits to each such device.

4. Filter as defined in claim 3, in which the distributing part of said distributor is provided downwards with a first sliding surface co-operating with a sliding surface of the collecting part that comprises said chambers and compartments, and upwards with a second sliding surface co-operating with a sliding surface of an enclosure bounding upwards said separating chamber, each cavity in the distributing part having a branch with one leg directed downwards to let the liquids fall by gravity in the compartments of the collecting part to then flow through the corresponding discharge outlets, the other leg being directed upwards and communicating, through the separating chamber, with a gas-suction device, a sealing plate extending in the plane of said separating chamber sliding surfaces, above the chambers in the distributing collecting part to isolate said chambers from any communication with the separating chamber.

5. Filter as claimed in claim 3, in which the distributor collecting part comprising said chambers and compartments, is integral with the separating chamber capping same, the distributing part provided with the cavities being mounted sidewise relative to the separating chamber and the collecting part, said cavities opening above the compartments and chambers thereof, said compartments forming together with the separating chamber a single enclosure while the collecting part chambers are isolated relative to the separating chamber.

6. Filter as defined in claim 3, in which the separating chamber is integral with the distributing part provided with the cavities, by forming an unit that bears on the distributor collecting base through sliding surfaces, said surfaces forming a sealing joint between the base and said unit under the weight thereof, the collecting part chambers opening in front of the cavities, a sealing sliding joint being formed between the cavities and the chambers under the action of resilient means, such as a spring or an air ring.

7. Filter as defined in claim 1, in which said compartments are joined to one another with the partitions thereof and form together a trough comprising a bottom having liquid-discharge outlets, an outer side wall extending from the bottom up to the sliding gasket co-operating with the distributing part, a side wall opposite said side wall extending above the top level foreseen for the liquids, said latter wall being connected to said sliding gasket by bearing plates extending at right angle to said wall and leaving between them passageways for releasing the gases to the suction device(s).

8. Filter as defined in claim 7, in which said partitions between the distributor compartments are adjustable in position over the whole length of the trough formed by said compartments and said partitions are removably fastened.

9. Filter as defined in claim 7, in which the sum $S_p$ of the cross-section area of the gas-release passageways between said bearing plates, the cross-section area $S_e$ of the separating chamber at the inlet level, and the cross-section area $S_s$ for the gas outlet from said chamber have respectively for minimum value 0.6, 0.8 and 0.15 dm$^2$ per square meter of filtering surface area, the vertical spacing between $S_e$ and $S_s$ being at least equal to $0.5 \times \sqrt{S}$.

* * * * *